(12) United States Patent
Webb, Jr. et al.

(10) Patent No.: US 7,100,096 B2
(45) Date of Patent: *Aug. 29, 2006

(54) SPECIAL ENCODING OF KNOWN BAD DATA

(75) Inventors: David Arthur James Webb, Jr., Groton, MA (US); Richard E. Kessler, Shrewsbury, MA (US); Steve Lang, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

This patent is subject to a terminal disclaimer.

(21) Appl. No.: 10/675,133

(22) Filed: Sep. 30, 2003

(65) Prior Publication Data

US 2004/0073851 A1    Apr. 15, 2004

Related U.S. Application Data

(63) Continuation of application No. 09/652,314, filed on Aug. 31, 2000, now Pat. No. 6,662,319.

(51) Int. Cl.
*G06F 11/00* (2006.01)

(52) U.S. Cl. .............................. 714/52; 714/49; 714/57
(58) Field of Classification Search .................. 714/49, 714/52, 54, 57
See application file for complete search history.

(56) References Cited

U.S. PATENT DOCUMENTS

| | | | |
|---|---|---|---|
| 5,261,066 A | 11/1993 | Jouppi et al. | ................ 395/425 |
| 5,317,718 A | 5/1994 | Jouppi | ......................... 395/425 |
| 5,457,701 A | 10/1995 | Wasilewski et al. | ........ 714/776 |
| 5,758,183 A | 5/1998 | Scales | ......................... 395/825 |
| 5,761,729 A | 6/1998 | Scales | ......................... 711/148 |
| 5,787,480 A | 7/1998 | Scales et al. | ................ 711/148 |

(Continued)

OTHER PUBLICATIONS

*Alpha Architecture Reference Manual*, Third Edition, The Alpha Architecture Committee, 1998 Digital Equipment Corporation (21 p.), in particular pp. 3-1 through 3-15.

(Continued)

*Primary Examiner*—Bryce P. Bonzo
*Assistant Examiner*—Joshua Lohn (57) ABSTRACT

A multi-processor system in which each processor receives a message from another processor in the system. The message may contain corrupted data that was corrupted during transmission from the preceding processor. Upon receiving the message, the processor detects that a portion of the message contains corrupted data. The processor then replaces the corrupted portion with a predetermined bit pattern known or otherwise programmed into all other processors in the system. The predetermined bit pattern indicates that the associated portion of data was corrupted. The processor that detects the error in the message preferably alerts the system that an error has been detected. The message now containing the predetermined bit pattern in place of the corrupted data is retransmitted to another processor. The predetermined bit pattern will indicate that an error in the message was detected by the previous processor. In response, the processor detecting the predetermined bit pattern preferably will not alert the system of the existence of an error. The same message with the predetermined bit pattern can be retransmitted to other processors which also will detect the presence of the predetermined bit pattern and in response not alert the system of the presence of an error. As such, because only the first processor to detect an error alerts the system of the error and because messages containing uncorrectable errors still are transmitted through the system, fault isolation is improved and the system is less likely to fall into a deadlock condition.

12 Claims, 4 Drawing Sheets

U.S. PATENT DOCUMENTS

| | | | |
|---|---|---|---|
| 5,802,585 A | 9/1998 | Scales et al. | 711/154 |
| 5,809,450 A | 9/1998 | Chrysos et al. | 702/186 |
| 5,867,501 A | 2/1999 | Horst et al. | 370/474 |
| 5,875,151 A | 2/1999 | Mick | 365/233 |
| 5,890,201 A | 3/1999 | McLellan et al. | 711/108 |
| 5,893,931 A | 4/1999 | Peng et al. | 711/206 |
| 5,914,953 A | 6/1999 | Krause et al. | 370/392 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A | 9/1999 | Scales et al. | 711/148 |
| 5,964,867 A | 10/1999 | Anderson et al. | 712/219 |
| 5,983,325 A | 11/1999 | Lewchuk | 711/137 |
| 6,000,044 A | 12/1999 | Chrysos et al. | 714/47 |
| 6,070,227 A | 5/2000 | Rokicki | 711/117 |
| 6,085,300 A | 7/2000 | Sunaga et al. | 711/168 |
| 6,151,689 A | 11/2000 | Garcia et al. | 714/49 |
| 7,020,810 B1 * | 3/2006 | Holman | 714/701 |
| 7,028,227 B1 * | 4/2006 | Kyoya | 714/49 |

OTHER PUBLICATIONS

*A Logic Design Structure For LSI Testability*, E. B. Eichelberger et al., 1977 IEEE (pp. 462-468).

*Direct RDRAM™ 256/288-Mbit (512K×16/18×32s)*, Preliminary Information Document DL0060 Version 1.01 (69 p.).

*Testability Features of AMD-K6™ Microprocessor*, R. S. Fetherston et al., Advanced Micro Devices (8 p.).

*Hardware Fault Containment in Scalable Shared-Memory Multiprocessors*, D. Teodosiu et al., Computer Systems Laboratory, Stanford University (12 p.), 1977.

*Cellular Disco: resource management using virtual clusters on shared-memory multiprocessors*, K. Govil et al., 1999 ACM 1-58113-140-2/99/0012 (16 p.).

*Are Your PLDs Metastable?*, Cypress Semiconductor Corporation, Mar. 6, 1997 (19 p.).

*Rambus® RIMM™ Module (with 128/144 Mb RDRAMs)*, Preliminary Information, Document DL0084 Version 1.1 (12 p.).

*Direct Rambus™ RIMM™ Module Specification Version 1.0*, Rambus Inc., SL-0006-100 (32 p.), 2000.

*End-To-End Fault Containment In Scalable Shared-Memory Multiprocessors*, D. Teodosiu, Jul. 2000 (148 p.).

* cited by examiner

SPECIAL ENCODING OF KNOWN BAD DATA

CROSS-REFERENCE TO RELATED APPLICATIONS

This application relates to the following commonly assigned applications entitled:

"Apparatus And Method For Interfacing A High Speed Scan-Path With Slow-Speed Test Equipment," Ser. No. 09/653,642, filed Aug. 31, 2000; "Priority Rules For Reducing Network Message Routing Latency," Ser. No. 09/652,322, filed Aug. 31, 2000; "Scalable Directory Based Cache Coherence Protocol," Ser. No. 09/652,703, filed Aug. 31, 2000; "Scalable Efficient I/O Port Protocol," Ser. No. 09/652,391, filed Aug. 31, 2000; "Efficient Translation Lookaside Buffer Miss Processing In Computer Systems With A Large Range Of Page Sizes," Ser. No. 09/652,552, filed Aug. 31, 2000; "Fault Containment And Error Recovery Techniques In A Scalable Multiprocessor," Ser. No. 09/651,949, filed Aug. 31, 2000; "Speculative Directory Writes In A Directory Based Cache Coherent Nonuniform Memory Access Protocol," Ser. No. 09/652,834, filed Aug. 31, 2000; "Broadcast Invalidate Scheme," Ser. No. 09/652,165, filed Aug. 31, 2000; "Mechanism To Track All Open Pages In A DRAM Memory System," Ser. No. 09/652,704, filed Aug. 31, 2000; "Programmable DRAM Address Mapping Mechanism," Ser. No. 09/653,093, filed Aug. 31, 2000; "Computer Architecture And System For Efficient Management Of Bi-Directional Bus," Ser. No. 09/652,323, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads And Writes To Reduce DRAM Bandwidth In A Directory Based CC-NUMA Protocol," Ser. No. 09/652,315, filed Aug. 31, 2000, all of which are incorporated by reference herein. Further, this application is a continuation of application Ser. No. 09/652,314 filed Aug. 31, 2000 now U.S. Pat. No. 6,662,319.

STATEMENT REGARDING FEDERALLY SPONSORED RESEARCH OR DEVELOPMENT

Not applicable.

BACKGROUND OF THE INVENTION

1. Field of the Invention

The present invention generally relates to a multi-processor system. More particularly, the invention relates to the detection of corrupted data in a multi-processor system. More particularly still, the invention relates to the detection of corrupted data and replacement of the corrupted data with a predetermined value to indicate to the rest of the system that a transmission error has occurred that has already been detected.

2. Background of the Invention

It often is desirable to include multiple processors in a single computer system, This is especially true for computationally intensive applications and applications that otherwise can benefit from having more than one processor simultaneously performing various tasks. It is not uncommon for a multi-processor system to have 2 or 4 or more processors working in concert with one another. Typically, each processor couples to at least one and perhaps three or four other processors.

Such systems usually require data and commands (e.g., read requests, write requests, etc.) to be transmitted from one processor to another. For the data or commands to pass from the source to the destination, the transmission may have to pass through one or more intervening processors interconnecting the source and the destination processors. Accordingly, messages can be passed from one processor to another and another with the intervening processors simply forwarding the message on to the next processor in the communication path.

A desirable feature of such systems is to be able to detect the presence of corrupted data and, if possible, correct the corrupted data. A data packet might have one of its bits reverse logic state (i.e., switch from a 0 to a 1 or 1 to a 0) at some point between the source and the destination. Further, more than one bit in a data packet might improperly change state. A single bit in a data packet that becomes corrupted is referred to as a "single bit error" and more than one bit becoming corrupted is a "multi-bit error." There are a variety of causes of such corruption. For example, cosmic radiation can change the state of individual gates causing a bit to change state. Further, it is possible for electromagnetic interference generated by nearby electronics to effect the electrical state gates in a multi-processor system. Regardless of the source of the data corruption it is desirable to be able to detect that the corruption has occurred and, if possible, correct the problem.

A variety of error detection schemes have been suggested and used. Some techniques are capable of only detecting single bit errors, while other techniques can detect double-bit errors. Further, some techniques also include error correction to permit the corrupted bit or bits to be corrected. Such error correction techniques generally require detecting, not only that an error has occurred, but also the identification of which bit(s) is erroneous. Some systems will be able to detect that a multi-bit error has occurred, but not be able to determine which bit is erroneous and thus be unable to correct the problem. There is a tradeoff between the capabilities of an error detection and correction scheme and its complexity. For instance, single bit detection and correction schemes are generally less complex than multi-bit error detection and correction schemes but cannot correct more than one corrupted bit at a time.

Whatever type of error detection and correction scheme is chosen for implementing in a given multi-processor system, a problem still remains as to what to do with those errors that can be detected, but not corrected. In conventional systems, there generally have been two choices. On one hand, the message containing the detected, but uncorrectable, error can be halted and not retransmitted to the next processor in the communication path. This approach advantageously isolates the error, but can cause the system to "deadlock" meaning that the system generally becomes unusable. Deadlock can occur when future tasks that the processors are to perform are contingent upon a particular data message. If that message is stopped due to a corrupted bit or bits, the system will not be able to determine what action to perform next.

Alternatively, the message with the corrupted bit can be forwarded on to the next processor in the communication link. Deadlock is avoided in this case, as the message is sent. However, each processor that receives the message will detect the error and signal an error event (typically by asserting an error flag). For a message with an error that passes through 10 processors, all 10 processors will signal an error. With 10 processors all indicating the same error, error isolation becomes problematic. That is, determining the source of the error becomes difficult, if not impossible.

Accordingly, a need exists to efficiently and effectively handle errors in a multi-processor system that can detect, but not necessarily correct the error. Such a system should be able to detect the error, preclude the system from becoming deadlocked and permit the error to be efficiently isolated. To date, no such system is known to exist.

BRIEF SUMMARY OF THE INVENTION

The problems noted above are solved in large part by a multi-processor system in which each processor can receive a message from one or more other processors in the system. The message may contain corrupted data that was corrupted during transmission from the preceding processor. Upon receiving the message, the processor detects that a portion of the message contains corrupted data. The processor then replaces the corrupted portion with a predetermined bit pattern that is known to or otherwise programmed into all other processors in the system. The predetermined bit pattern indicates that a data transmission error has occurred in the corresponding portion of the message. The processor that detects the error in the message preferably alerts the system, for example by setting an error flag, that an error has been detected. The message now containing the predetermined bit pattern in place of the corrupted data can be retransmitted to another processor. The predetermined bit pattern will indicate that an error in the message was detected by the previous processor. In response, the processor detecting the predetermined bit pattern preferably will not alert the system of the existence of an error. The same message with the predetermined bit pattern then can be retransmitted to other processors which also will detect the presence of the predetermined bit pattern and in response not alert the system of the presence of the error. As such, because only the first processor to detect an error alerts the system of the error and because messages containing uncorrectable errors still are transmitted through the system, fault isolation is improved and the system is less likely to fall into a deadlock condition.

Each processor preferably includes a memory controller for connection to a memory device, an interface to an input/output controller, a router for connection to one or more other processors, and other components. The router transmits and receives messages to and from other processors in the system. The router also detects transmission errors and replaces the erroneous portion with the predetermined bit pattern.

Each message preferably includes multiple "ticks" of data with each tick comprising multiple bits of information including error check bits. The error check bits permit the router to detect transmission errors and may permit correction of the erroneous bits. Some types of errors, however, are uncorrectable given the number of error check bits. These uncorrectable errors can be detected but cannot be corrected. Upon detecting an uncorrectable error in a tick, the router replaces all of the bits in the corrupted tick with the predetermined bit pattern. Data ticks include multiple data bits and multiple error check bits. An exemplary predetermined bit pattern includes all 1's to replace the data bits and an otherwise unused value to replace the error check bits.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "transmission error" is intended to include any errors a message experiences whether caused by external influences (e.g., cosmic radiation, EMI) or caused by a processor itself.

A "tick" refers to one or more bits of information (e.g., data, status, commands) that is the standard transfer size for a given system.

DETAILED DESCRIPTION OF THE PREFERRED EMBODIMENTS

Figure 1:
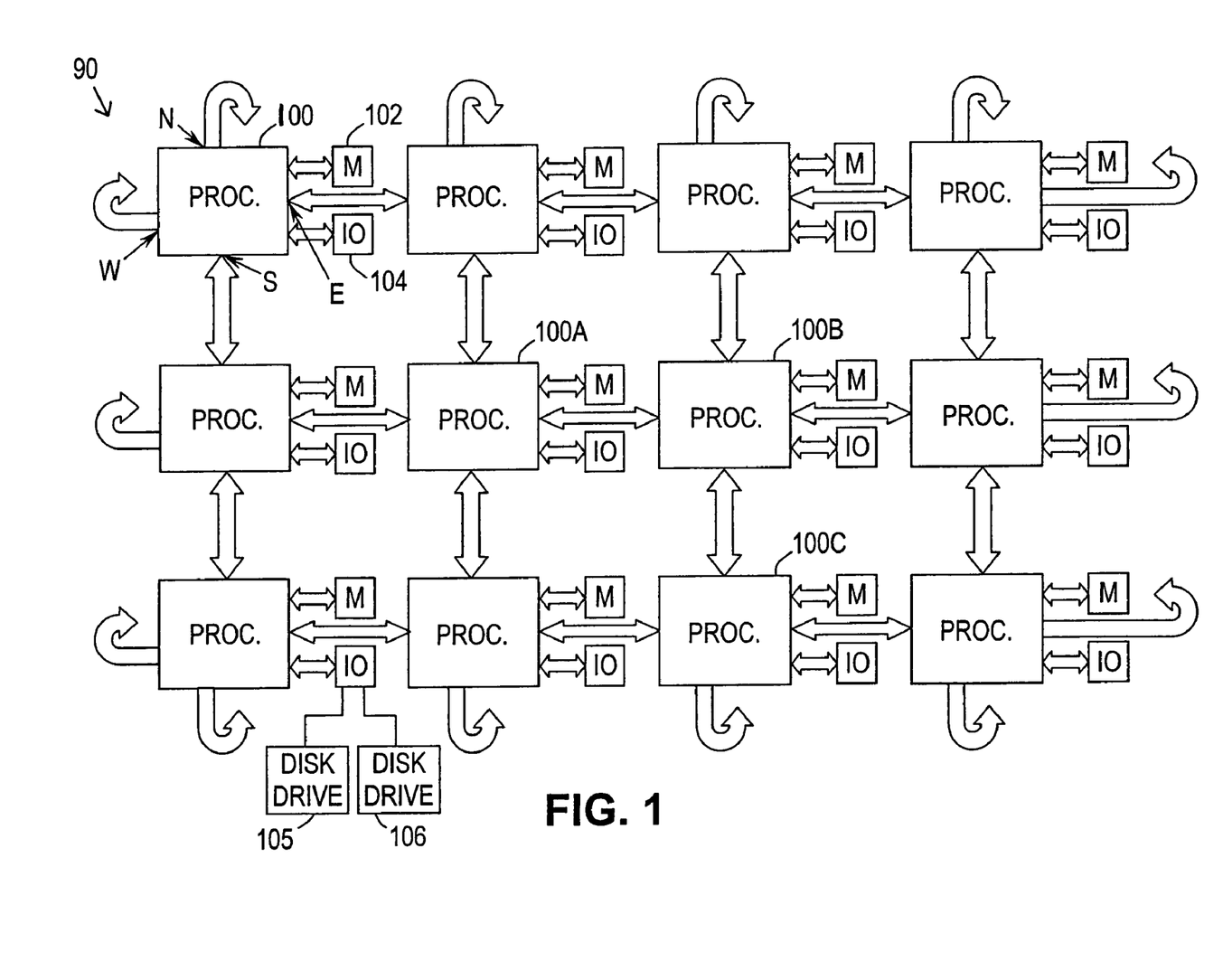
FIG. 1 shows a system diagram of a plurality of microprocessors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes 12 processors 100, each processor coupled to a memory and an I/O controller. Each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout wrap around and connect to processors on the opposite side to implement a 2D torus-type connection. Although 12 processors 100 are shown in the exemplary embodiment of FIG. 1, any desired number of processors (e.g., 256) can be included.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are implemented as Rambus Interface Memory Modules ("RIMMs").

In general, computer system 90 can be configured so that any processor 100 can access its own memory 102 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2A:
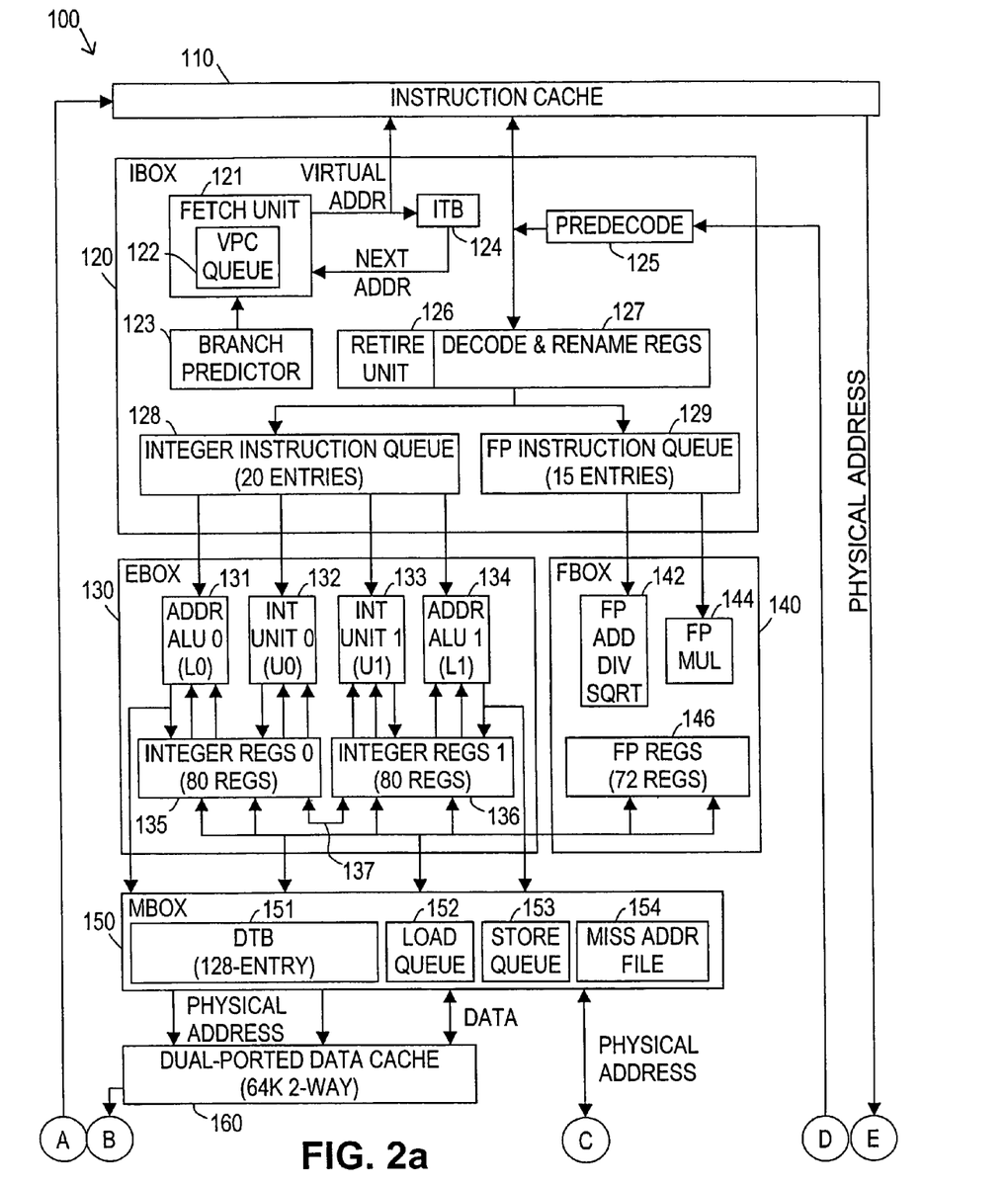
FIGS. 2*a* and 2*b* show a block diagram of the microprocessors of FIG. 1.
Figure 2B:
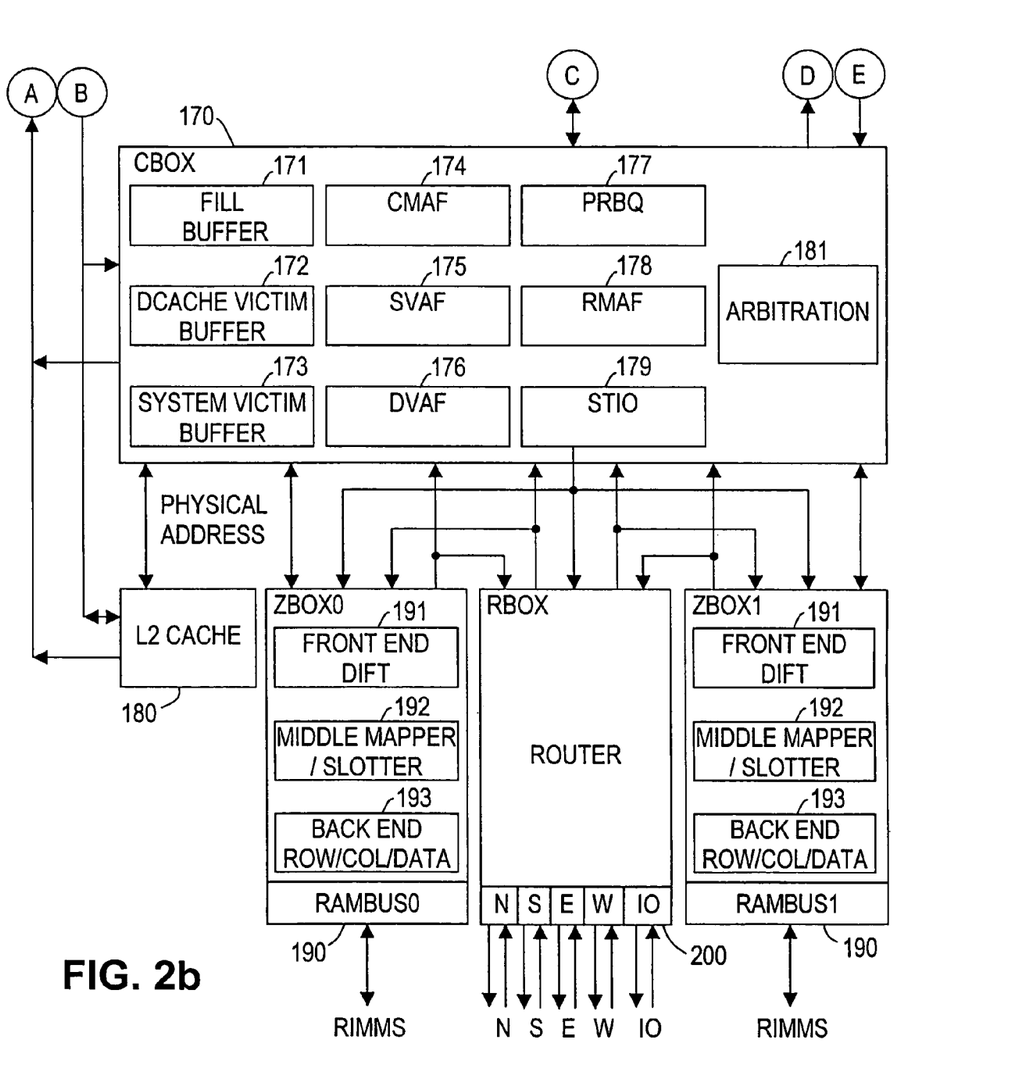

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router nit ("Rbox") 200. The following discussion describes each of these units.

Each of the various functional units 110–200 contains control logic that communicate with various other functional units control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The branch predictor 123 is used by the Ibox 120 with regard to branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the etch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit (Fbox) registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
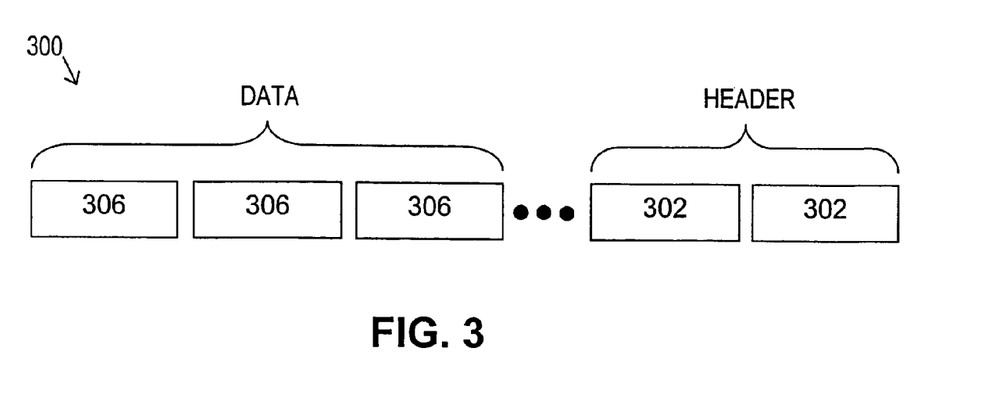
FIG. 3 shows a data packet comprising multiple data "ticks"

Referring now to FIG. 3 with reference also to FIG. 1, data is transmitted from an Rbox 200 of a processor 100 in one or more discrete, sequential packets of data also referred to as "ticks." FIG. 3 shows an exemplary embodiment of a message 300. Message 300 preferably comprises one or more header ticks 302 followed by one or more data ticks 306. Header ticks 302 contain various parameters of information such as source identifier, destination identifier, route information (e.g., direction of travel of the message—north, south, east, west), and other useful information to facilitate routing the message from its source processor to the intended destination processor. The data ticks 306 contain the data to be transmitted.

As explained previously, each message 300 is routed from one processor 100 to an adjacent processor 100. Further, each message 300 may be routed through multiple processors 100 from the source processor to the destination processor. Transmission errors can occur anywhere along the path from the source to the destination. A transmission error can occur in any one or more ticks 302, 306. A processor 100 may receive a message 300 that is already corrupted. The preferred embodiment of the invention, explained further with respect to FIGS. 4 and 5 below, permits a processor 100 that receives a message that is already corrupted to reformat or otherwise alter the corrupted data tick in such a way so as to permit the corrupted message to be retransmitted to another processor with an indication that a particular tick is corrupted but that the error has already been detected by another processor. In this way, only the processor that initially detects the error alerts the system of the presence of the error; all other processors receiving the message with the altered tick preferably do not signal an error.

For example, referring briefly to FIG. 1, a message 300 may be generated by processor 100A and routed through processor 100B to processor 100C. A tick in the message may become corrupted between processors 100A and 100B. Processor 100B detects the corruption, signals an error condition to system 90, and reformats the corrupted tick in such a way so that when processor receives the message, processor 100C can determine that the corrupted tick was not corrupted during its transmission from processor 100B. With this information, processor 100C preferably will not signal an error condition to system 90. In this manner, corrupted messages still are routed through the system thereby avoiding deadlock conditions. Further, only the first processor to detect a corrupted tick (processor 100B in this example) will signal an error condition to the system thereby facilitating and improving the system's error isolation capability.

Any manner for altering a corrupted tick that preferably is known by each processor 100 in the system 90 is acceptable. Preferably, any processor 100 will reformat a corrupted tick to a particular, predetermined value. The particular value used to reformat the tick preferably is one that is known by all other processors in the system to indicate the presence of an error that was not caused during transmission from the immediately preceding processor in the transmission path. In other words, the particular predetermined value indicates that the associated tick has an error that has already been detected and reported to the system. Although any one of a variety of predetermined values can be used to reformat the corrupted tick, the value selected is one that preferably would not be expected to occur during normal system operation.

Figures 4, 5:
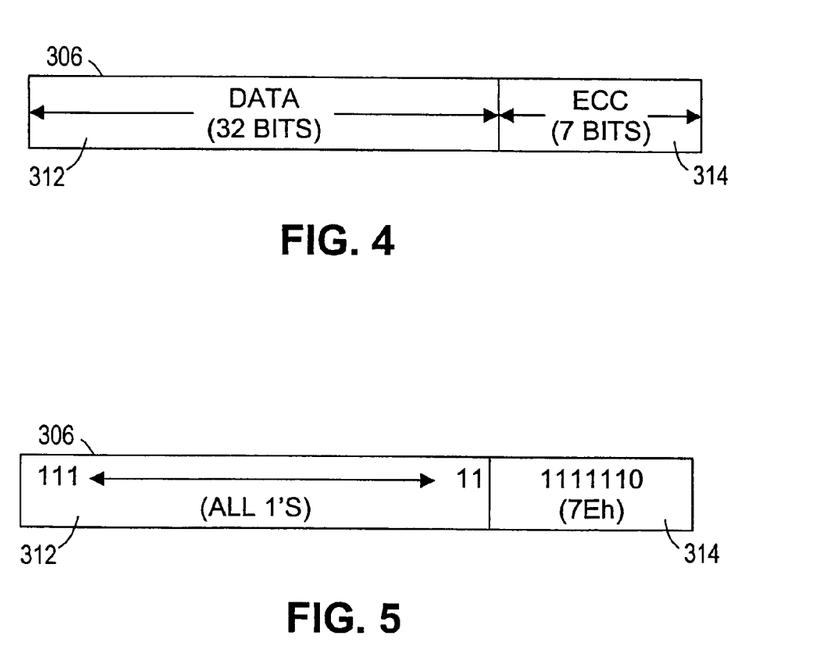
FIG. 4 shows the format for each data tick in accordance with a preferred embodiment of the invention.
FIG. 5 shows a data tick that has been reformatted with a predetermined error code to signal other processors that one or more bits in the data tick was corrupted by or during transmission from a previous processor.

Referring now to FIG. 4, each tick in the preferred embodiment, such as data tick 306 shown, preferably comprises 32 bits of data 312 and 7 bits of error code check bits 314. It should be apparent, however, that the overall size of each tick, the data portion 312 and the error check bits 314 can be desired number of bits. The check bits 314 permit the processors to detect and possibly correct errors in the data bits 312 in accordance with any one of a variety of widely known error detection and correction schemes (e.g., ECC).

For those errors that can be detected by a processor 100, but not corrected, the processor preferably reformats the tick in accordance with the exemplary format shown in FIG. 5. More specifically, the processor's router detects errors and reformats corrupted ticks as described herein.

In FIG. 5, the data portion 312 of the tick has been replaced with all 1s and the check bits 314 have been replaced by the binary value "1111110" which is the hexadecimal value 7E. These values for bits 312 and 314 preferably correspond to a known double error value with a "garbage" code for the check bits. This combination of values for bits 312 and 314 thus is one that represents an invalid value (i.e., a value that would normally indicate a bit error has occurred). However, the processors 100 are programmed to interpret this particular value as indicating the existence of error that was detected by another processor in the system 90.

One of ordinary skill in the art should immediately recognize that any value for bits 312 and 314 can be used that does not represent a valid set of data. Moreover, the claims which follow, unless otherwise limited, are intended to include any manner of altering a corrupted tick in a known, predetermined manner to indicate to all other processor receiving the altered tick that the error has already been detected. Further, this procedure can apply to any tick including the header ticks 302.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a plurality of processors coupled together between which messages can be routed;
an I/O controller coupled to one or more of said processors;
at least one I/O device coupled to an I/O controller; and
wherein each processor is capable of detecting an error in a message sent from another processor in the system and reformatting the message to indicate to other of said processors that the message contains a transmission error;
wherein each of said messages between said processors comprises a header ticks and data tick, the data tick comprising error check bits, and wherein upon detecting an error has occurred in the message, the processor alters the data tick error check bits in a predetermined manner to indicate to other of said processors that the message contains an error.

2. A computer system, comprising:
a plurality of processors coupled together between which messages can be routed;
an I/O controller coupled to one or more of said processors;
at least one I/O device coupled to an I/O controller;
wherein each processor is capable of detecting an error in a message sent from another processor in the system and reformatting the message to indicate to other of said processors that the message contains a transmission error;
wherein each of said messages between said processors comprises a header tick and a data tick, each tick comprising multiple bits of information, and wherein upon detecting an error has occurred in a data tick, the processor replaces the bits of information in the data tick with a predetermined bit pattern.

3. The computer system of claim 2 wherein said predetermined bit pattern includes a known double bit error code.

4. A processor, comprising:
a memory controller that coordinates transactions to a memory device; and
a router coupled to said memory controller and providing interfaces to one or more other processors;
wherein said router is capable of detecting a transmission error in a message received from another processor and reformatting the message to indicate that the message contains a transmission error that has already been detected;
wherein said message comprises a data block and a block comprising error check bits, and wherein upon detecting that a transmission error has occurred in tbe message, the router alters the error check bits in a predetermined manner to indicate that the message contains a transmission error.

5. A processor, comprising:
a memory controller that coordinates transactions to a memory device; and
a router coupled to said memory controller and providing interfaces to one or more other processors;
wherein said router is capable of detecting a transmission error in a message received from another processor and reformatting the message to indicate that the message contains a transmission error that has already been detected;
wherein said message comprises a data block and a header block, and wherein upon detecting that a transmission error has occurred in the data block the router replaces the bits of information in the data block with a predetermined bit pattern.

6. The computer system of claim 5 wherein said predetermined bit pattern includes a known double bit error code.

7. A method of fault isolation in a multi-processor computer system, comprising:
(a) receiving a message;
(b) detecting an error in said message;
(c) replacing the erroneous portion of said message with a predetermined bit pattern to indicate to other processors in said system that an error has occurred in said message and said error has already been detected; and
(d) transmitting the message to another processor in said system.

8. The method of claim 7 further including:
(e) alerting the system that a fault has been detected in said message.

9. The method of claim 8 further including:
(f) receiving said message that has been altered in (c);
(g) determining whether said message includes said predetermined bit pattern; and
(h) if said message includes said predetermined bit pattern, not alerting the system that a fault is present in said message.

10. The method of claim 9 further including:
(i) transmitting said message with said predetermined bit pattern to another processor in said system.

11. The method of claim 7 further including:
(j) receiving said message that has been altered in (c);
(k) determining whether said message includes said predetermined bit pattern; and
(l) if said message includes said predetermined bit pattern, not alerting the system that a fault is present in said message.

12. The method of claim 11 further including:
(m) transmitting said message with said predetermined bit pattern to another processor in said system.

* * * * *

UNITED STATES PATENT AND TRADEMARK OFFICE
CERTIFICATE OF CORRECTION

PATENT NO. : 7,100,096 B2 Page 1 of 1
APPLICATION NO. : 10/675133
DATED : August 29, 2006
INVENTOR(S) : David Arthur James Webb, Jr. et al.

It is certified that error appears in the above-identified patent and that said Letters Patent is hereby corrected as shown below:

In column 5, line 43, delete "nit" and insert -- unit --, therefor.

In column 6, line 13, delete "etch" and insert -- fetch --, therefor.

In column 14, line 14, in Claim 4, delete "tbe" and insert -- the --, therefor.

In column 14, line 29, in Claim 5, after "block" insert -- , --.

Signed and Sealed this

Twenty-eighth Day of July, 2009

JOHN DOLL
*Acting Director of the United States Patent and Trademark Office*